United States Patent [19]

Skardal

[11] Patent Number: 4,617,114

[45] Date of Patent: Oct. 14, 1986

[54] VORTEX CLEANER FOR CLEANING AND DEAERATING PAPER PULP SUSPENSIONS

[76] Inventor: Karl A. Skardal, Bergstigen 21A, S-182 74 Stocksund, Sweden

[21] Appl. No.: 704,886

[22] Filed: Feb. 25, 1985

[30] Foreign Application Priority Data

Mar. 7, 1984 [SE] Sweden .............................. 8401275

[51] Int. Cl.[4] ......................... B04C 3/00; B01D 19/00

[52] U.S. Cl. .................................... 209/211; 209/144; 210/512.1

[58] Field of Search ............................... 209/211, 144; 210/512.1, 512.2; 162/261

[56] References Cited

U.S. PATENT DOCUMENTS

| | | | |
|---|---|---|---|
| 2,379,411 | 6/1945 | Berges | 209/211 |
| 2,757,582 | 8/1956 | Freeman et al. | 209/211 |
| 2,816,490 | 12/1957 | Boadway et al. | 209/211 |
| 2,849,117 | 8/1958 | Rietema | 209/211 |
| 3,421,622 | 1/1969 | Wurtmann | 209/211 |
| 3,425,545 | 2/1969 | Zemanek et al. | 209/211 |
| 3,696,934 | 10/1972 | Oisi | 210/512.1 |
| 3,928,186 | 12/1975 | Zemanek | 209/211 |
| 3,960,734 | 6/1976 | Zagorski | 210/512.1 |

FOREIGN PATENT DOCUMENTS 238137 of 1945 Sweden .............................. 209/211

*Primary Examiner*—S. Leon Bashore
*Assistant Examiner*—K. M. Hastings

[57] ABSTRACT

A vortex cleaner for fractionating particle-liquid suspensions comprises an elongate, upstanding vortex chamber having a circular cross-section and narrowing downwardly to its bottom end. A substantially tangential suspension inlet means is disposed in the wider end of the vortex chamber and a further chamber located axially above the wider end of the vortex chamber. The cleaner further comprises a light-fraction outlet means having pipe means which projects axially into the wider end of the vortex chamber and has a smaller diameter than said wider end, and the upper outlet end of which pipe means opens into the further chamber. A heavy-fraction outlet means is disposed at the narrow end of the vortex chamber, and a light-fraction outlet opening is located in the further chamber axially beneath the upper outlet end of the pipe means, this further chamber extending co-axially with and around the pipe means in a manner to enclose the upper end thereof and to form a space above the outlet end of the pipe means. Air outflow means extend into the aforementioned space at a location above the upper end of the pipe means.

5 Claims, 3 Drawing Figures

VORTEX CLEANER FOR CLEANING AND DEAERATING PAPER PULP SUSPENSIONS

FIELD OF THE INVENTION

The present invention relates to a vortex cleaner for fractionating particle-liquid-suspensions, and particularly although not exclusively paper-pulp suspensions.

Vortex cleaners are used to a great extent within the paper and paper pulp industries for cleansing paper-pulp suspensions from such impurities as splinters, shives, grains of sand, particles of metal, and even larger metal objects, such as paper clips, staples, nails etc.

DESCRIPTION OF THE RELATED ART

Principally, such a vortex cleaner operates in the following manner: The suspension to be processed, the so-called inject, is fed at high speed through a tangential inlet at the wider end of an elongate vortex chamber, which has a circular cross-section and tapers towards its one end. The input suspension forms a helical vortex flow which moves along the inside of the vortex-chamber wall, towards the opposite, narrower end of the chamber. Under the influence of the centrifugal forces prevailing in the vortex, the particles present in the suspension endeavour to orient themselves so that coarser and heavy particles, for example, such impurities as splinters shives, sand-grains, stones, metal particles, metal objects and the like, collect as far out against the chamber wall as possible, while the lighter particles in the suspension, i.e. the useful fibres in the paper-pulp suspension, remain close to the centre axis of the vortex chamber. The vortex layer which is located nearest the chamber wall and in which the heavier impurities are concentrated continues to move in the narrowing part of the vortex chamber, towards an outlet at the narrow end of the vortex chamber, and is discharged through this outlet, as a reject fraction, i.e. a fraction containing the heavier contaminants. Normally, the reject is discharged to a so-called reject chamber which is arranged externally of the narrower end of the vortex chamber. This reject chamber includes means for controlling the amount of reject discharged, and the reject is moved out of the chamber through a discharge conduit. In contrast hereto, the inner part of the vortex flow in the vortex chamber turns within the narrowing end of the chamber and continues in an axially opposite direction, to form an internal, helical vortex flow, which is taken out at the wider end of the chamber as a lighter fraction, the so-called accept, which when cleansing a paper pulp suspension comprises mostly useful fibres. Normally, the accept is removed from the vortex chamber by means of a so-called vortex finder pipe, which projects axially into the wider end of the vortex chamber and extends to a location therein beyond the tangentially directed inject inlet.

One problem encountered when manufacturing paper is that subsequent to being fed through the head box and onto the wire of the paper machine the paper-pulp suspension or stock often has entrapped therein bubbles of air, which give rise to visible faults in the paper web produced. These air bubbles originate from air which has been mixed with the stock during its preparation, for example during the pulping or slushing process. For the purpose of removing such air bubbles from the stock prior to feeding the stock to the paper machine, it is normal to deaerate the stock, for example in a vessel placed under vacuum. These known stock-deaerating arrangements, however, are expensive and space consuming. Attempts have also been made to deaerate the paper-pulp suspension or stock in conjunction with its treatment in a vortex cleaner of the aforementioned kind. As a result of the centrifugal forces prevailing in the helical vortex flow, air present in the suspension fed to the vortex cleaner is also separated from the stock. Because of its low specific weight, the separated air collects closely adjacent the centre axis of the vortex chamber, in a manner to form an air core therealong. As a result of the large centrifugal forces prevailing within the vortex chamber, the pressure of the air core is often beneath atmospheric pressure. Since the air present in the suspension fed to a vortex cleaner is automatically separated from the suspension during the action of the cleaner, attempts have been made to remove the aforesaid air core separately by means of a narrow pipe, which is inserted coaxially into the vortex chamber, either at its narrower end or its wider end. The pipe is then subjected to a sub-pressure in an attempt to withdraw the air core by suction. These attempts, however, have not been particularly successful, mainly because the air core is not particularly stable, but swings laterally from side to side, often changing position, and consequently it has been difficult to locate the core in a positive and reliably manner with the aid of the narrow suction pipe. Consequently, it has only been possible to remove a minor part of this air through the suction pipe. In addition, considerable quantities of suspension have accompanied the air withdrawn. This method also requires the use of relatively complicated and expensive apparatus for generating the sub-pressure required to withdraw the air core.

SUMMARY OF THE INVENTION

Consequently, the object of the present invention is to provide such a vortex cleaner which will enable the greater part of the air incorporated in the suspension being fed to the vortex cleaner to be removed from said suspension in an effective and reliable manner.

Accordingly the invention comprises a vortex cleaner for fractionating particle-liquid suspensions, comprising an elongate, upstanding vortex chamber having a circular cross-section and narrowing downwardly to its bottom end, a substantially tangential suspension inlet means disposed in the wider end of the vortex chamber, a further chamber located axially above the wider end of the vortex chamber, a light-fraction outlet means including pipe means projecting axially into the wider end of the vortex chamber and having a smaller diameter than said wider end, and the upper outlet end of which pipe means opens into said further chamber, a heavy-fraction outlet means disposed at the narrow end of the vortex chamber, and a light-fraction outlet opening located in said further chamber axially beneath the upper outlet end of the pipe means, said further chamber extending co-axially with and around said pipe means in a manner to enclose the upper end thereof and to form a space above said outlet end of said pipe means, and an air venting tube extending into said space at a location above said upper end of said pipe means.

BRIEF DESCRIPTION OF THE DRAWING

The invention will now be described in more detail with reference to a number of embodiments thereof illustrated in the accompanying drawings, in which.

DETAILED DESCRIPTION OF THE PREFERRED EMBODIMENTS

Figure 1:
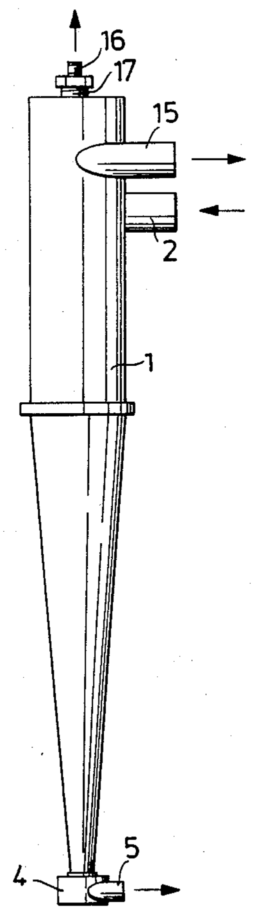
FIG. 1 is a side view of a vortex cleaner constructed in accordance with the invention.
Figure 2:
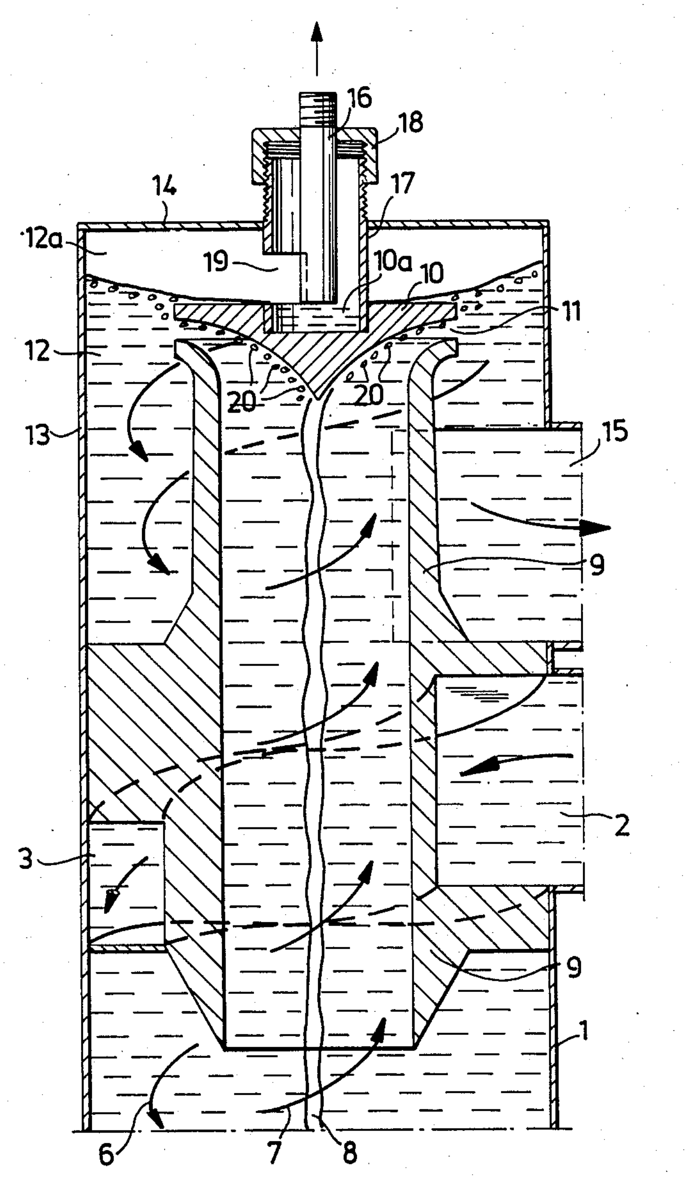
FIG. 2 is an axial sectional view in larger scale of the upper part of a vortex cleaner according to one embodiment of the invention.

The vortex cleaner according to the invention illustrated schematically by way of example in FIGS. 1 and 2 includes, in a conventional manner, an elongate, vertically arranged vortex chamber 1 which has a circular cross-sectional shape and which tapers along a part of its length towards its lower end. Arranged at the upper, wider end of the vortex chamber 1 is a tangentially directed inlet 2 through which the suspension to be treated, the so-called inject, is introduced into the vortex chamber 1. This inject is conducted from the inlet 2 through a helical inlet channel 3 (cf FIG. 2) into the vortex chamber 1 and there forms a helical vortex flow 6 in the proximity of the wall of the chamber 1. Arranged in a conventional manner at the lower, narrow end of the vortex chamber 1 is a so-called reject chamber 4, into which the axial discharge opening for the heavy fraction in the lower end of the vortex chamber 1 opens out, and from which the reject is discharged through a conduit 5. The vortex chamber 1 and the reject chamber 4 may have any suitable known design, and are not therefore illustrated in detail.

In FIG. 2, the vortex flow passing adjacent the wall of the vortex chamber 1, down towards the narrow end of the chamber, is referenced 6, while the internal vortex flow which passes upwardly towards the wider end of the chamber 1 and which contains the lighter fraction, the so-called accept, is referenced 7. The figure also illustrates an air core 8 which is formed centrally in the vortex chamber 1 along its geometric axis in the afore-described manner.

The accept flow 7 and the centrally located air core 8 are removed from the vortex chamber 1 in a conventional manner, by means of a vortex finder pipe 9, which extends coaxially into the vortex chamber 1 through the wider end thereof and continues axially through the chamber 1 beyond the inlet 2 and the inject inlet channel 3 at least.

Arranged in spaced relationship with the upper end of the finder pipe 9 is a cover or lid 10, such as to form an annular radially directed gap 11 between the cover and the upper end of the finder pipe 9. As illustrated in the Figure, the upper end of the finder pipe 9 is suitably gradually flared, while the underside of the cover 10 is substantially of conical configuration. Thus, the helical accept flow 7 through the finder pipe 9 is deflected so as to flow out through the gap 11. The upper part of the finder pipe 9 and the cover 10 are surrounded by a chamber 12 having a cylindrical outer wall 13 and an upper end wall 14. The accept flow enters the chamber 12 through the annular gap 11. The chamber 12 has arranged therein an outlet 15 for the accept flow, this outlet being arranged in the cylindrical outer wall 13 of the chamber at an axial distance beneath, i.e. below, the annular gap 11. As will be seen from the drawing, the chamber 12 also extends above the cover 10, so as to form a space 12*a* between the upper surface of the cover 10 and the end wall 14 of the chamber 12. Projecting coaxially into the space 12*a* is a tube 16, of which the innermost, or lower, end is located substantially level with the upper surface of the cover 10, the centre part of which upper surface in the illustrated embodiment is provided with a recess 10*a*. In the illustrated embodiment, the cover 10 is supported by a sleeve 17 which is mounted in the wall 14 and which coaxially embraces the tube 16, said tube being held in position in the sleeve 17 by means of a screw coupling 18. Arranged in the wall of the sleeve 17 is an opening 19, forming a communication between the space 12*a* and the lower end of the tube 16.

The invention has the following mode of operation: The central air core 8 in the helical accept flow 7 through the vortex finder pipe 9 is broken up into air bubbles, schematically illustrated at 20 in the drawing, and these air bubbles are entrained by the accept flow out to the annular gap 11, the air bubbles striving to follow the contours of the under surface of cover 10. As a result of their lower specific weight, the air bubbles 20 will, in the surrounding chamber 12, rise and combine with an air cushion formed in the space 12*a* above the upper surface of the cover 10. Thus, the accept flow passing through the accept outlet 15 will be substantially free from air bubbles. As will be understood, the aforementioned air cushion is formed in the upper part of the chamber 12, within the space 12*a* above the cover 10, due to the fact that the lower end of the tube 16, operative as an air outflow means, is located beneath the upper end wall 14 of the chamber 12 and in the illustrated embodiment substantially on a level with the upper surface of the cover 10. When further air bubbles 20 pass to the air cushion in the space 12*a* in the afore-described manner, a corresponding amount of air will be pressed out through the tube 16. A certain, minor quantity of accept will also be forced through the tube 16, together with the air. Since the accept discharged in this way contains extremely good fibres, it can suitably be returned to the inlet of the vortex cleaner system.

Because the air bubbles 20 flow out through the annular gap 11 into the surrounding chamber 12 in the proximity of the upper liquid surface in said chamber, the air bubbles are able to free themselves from the liquid more readily. This release of the air bubbles from the liquid is facilitated still further by the fact that the liquid outlet 15 from the chamber 12 is located at a considerable distance beneath the annular gap 11.

Figure 3:
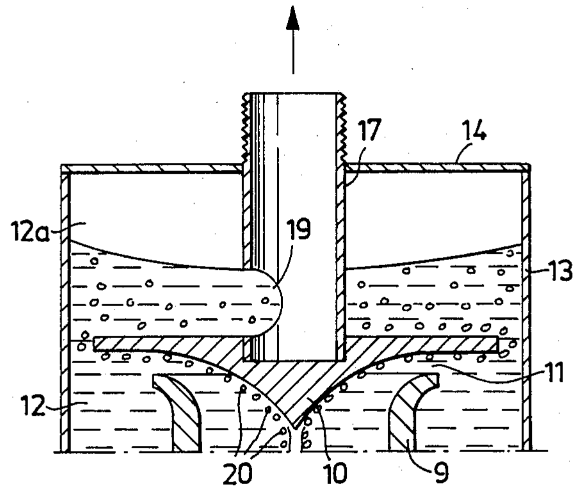
FIG. 3 is an axial sectional view in larger scale of the upper part of a vortex cleaner according to a second embodiment of the invention.

The main difference between the embodiment of the invention illustrated in FIG. 3 and the aforedescribed embodiment illustrated in FIG. 2 resides in the fact that the tube 16 and the tube coupling 18 have been omitted, so that the sleeve 17, which is coarser than the tube 16, itself functions as an outlet tube. This embodiment is primarily suited when, in addition to air, other contaminants having a lower specific weight than fibres, for example plastic impurities, are to be removed from the accept flow 7 passing through the vortex finder pipe 9. Such impurities collect in the vortex cleaner, in the vicinity of the geometric axis thereof, and accompany the accept flow 7 close to the under surface of the cover 10 in a manner substantially similar to the air bubbles 20. Thus, these light impurities will also rise to the space 12*a*, from which they are able to flow out through the sleeve 17, together with air and a certain amount of accept. In order to remove these lighter impurities, it is necessary to take out a larger flow from the space 12*a* in the chamber 12, and hence the coarser sleeve 17 is better suited as an outlet than the narrow pipe 16. The flow from the sleeve 17, said flow comprising partly accept and light impurities together with air, can be passed to a further stage for continued separation, subsequent to removing the air in, for example an open surface tank.

An embodiment of a vortex cleaner according to the invention is also conceivable in which the cover 10 above the upper end 9 of the vortex finder pipe is omitted and the accept flow 7 caused to flow directly into the chamber 12, without first being deflected radially. The air entrained by the accept flow will also in this case endeavour to collect in the upper part 12*a* of the chamber 12, from which the air can be discharged together with a certain minor quantity of accept, and also optionally lighter impurities, through a pipe which projects into the upper part of the chamber 12 and the inlet opening of which is located axially above the upper end of the vortex finder pipe 9, and preferably somewhat beneath the upper end wall 14 of the chamber 12.

I claim:

1. A vortex cleaner for fractionating a particle-liquid suspension, in particular a paper pulp suspension, comprising:

an elongate, upstanding vortex chamber having a circular cross-section and narrowing downwardly from an upper, relatively wider end provided with an end wall to a lower, relatively narrow end, a substantially tangential suspension inlet to said vortex chamber at its upper wider end for a suspension to be treated, an outlet for a relatively heavier fraction at the lower narrower end of said vortex chamber, outlet means for a relatively lighter fraction including a vortex finder pipe with a diameter smaller than the diameter of said upper wider end of said vortex chamber, said vortex finder pipe extending coaxially through the upper end wall of said vortex chamber and having a lower portion projecting axially into the vortex chamber with its lower open end located lower than said suspension inlet and an upper portion projecting axially upwardly from said end wall with its upper open end located substantially above said end wall, an additional chamber located axially above the upper end wall of said vortex chamber and having a cylindrical peripheral wall coaxially surrounding the upper portion of said vortex finder pipe and extending axially above the upper end of the vortex finder pipe, a lower end wall coinciding with the upper end wall of the vortex chamber and an upper end wall located substantially above the upper end of the vortex finder pipe, so that said additional chamber encloses a space located above the upper end of the vortex finder pipe, an outlet opening for said relatively lighter fraction located in the cylindrical peripheral wall of said additional chamber substantially lower than the upper end of the vortex finder pipe, a disc-shaped flow-deflecting body located axially above, and slightly axially spaced from, the upper end of the vortex finder pipe so as define between itself and the upper end of the vortex finder pipe an annular gap forming a flow passage from said vortex finder pipe into said additional chamber, and an air venting tube extending into said additional chamber and having its inner open end located in said space enclosed by said additional chamber above said flow-deflecting body.

2. A vortex cleaner as claimed in claim 1, wherein the upper end of the vortex finder pipe is gradually flared, and said flow-deflecting body has a substantially conical lower flow-deflecting surface facing the upper end of the vortex pipe.

3. A vortex cleaner as claimed in claim 1, wherein the air venting tube projects into said space enclosed by said additional chamber substantially coaxially through the upper end wall of said additional chamber.

4. A vortex cleaner as claimed in claim 3, wherein the air venting tube is surrounded coaxially by a sleeve having its upper end mounted in the upper end wall of said additional chamber and its lower end attached to and supporting said flow-deflecting body, an opening being provided in the wall of said sleeve to form a flow path from said space enclosed of said sleeve to form a flow path from said space enclosed by said additional chamber to the air venting tube.

5. A vortex cleaner as claimed in claim 3, wherein the lower end of the air venting tube is secured to said flow-deflecting body in a manner to support said body, an opening being provided in the wall of the air venting tube above the flow-deflecting body.

* * * * *